United States Patent
Takikita

(10) Patent No.: US 8,823,320 B2
(45) Date of Patent: Sep. 2, 2014

(54) VEHICLE CHARGING SYSTEM AND VEHICLE CHARGING METHOD

(75) Inventor: Mamoru Takikita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 483 days.

(21) Appl. No.: 13/050,580

(22) Filed: Mar. 17, 2011

(65) Prior Publication Data

US 2012/0074900 A1  Mar. 29, 2012

(30) Foreign Application Priority Data

Sep. 27, 2010 (JP) .................................. 2010-215393

(51) Int. Cl.
- *H02J 7/00* (2006.01)
- *B60L 11/18* (2006.01)
- *H02J 7/02* (2006.01)

(52) U.S. Cl.
CPC ......... *B60L 11/1811* (2013.01); *B60L 11/1868* (2013.01); *Y02T 10/7066* (2013.01); *Y02T 90/127* (2013.01); *H02J 7/02* (2013.01); *Y02T 10/7005* (2013.01); *Y02T 10/7088* (2013.01); *Y02T 90/14* (2013.01)
USPC .......................... 320/109; 320/111; 180/65.21

(58) Field of Classification Search
USPC ................. 320/109, 111; 180/65.1, 65.21
See application file for complete search history.

(56) References Cited

U.S. PATENT DOCUMENTS

| | | | | |
|---|---|---|---|---|
| 5,549,172 A | * | 8/1996 | Mutoh et al. ................ | 180/65.1 |
| 5,739,668 A | * | 4/1998 | Nishikiori .................... | 320/111 |
| 6,114,775 A | * | 9/2000 | Chung et al. ................ | 307/10.1 |
| 6,166,517 A | * | 12/2000 | Wakashiro et al. ......... | 320/104 |
| 2009/0024267 A1 | * | 1/2009 | Kawai ............................ | 701/22 |
| 2010/0228413 A1 | * | 9/2010 | Fujitake ........................ | 701/22 |

FOREIGN PATENT DOCUMENTS

| | | |
|---|---|---|
| JP | 2000-341879 A | 12/2000 |
| JP | 2008-149897 A | 7/2008 |
| JP | 2008-206300 A | 9/2008 |

OTHER PUBLICATIONS

Japanese Office Action dated Jul. 17, 2012 issued in corresponding Japanese Patent Application No. 2010-215393.
Japanese Office Action issued Jan. 8, 2013 in a corresponding Japanese Patent Application No. 2010-215393.

* cited by examiner

*Primary Examiner* — Yalkew Fantu
(74) *Attorney, Agent, or Firm* — Sughrue Mion, PLLC

(57) ABSTRACT

A vehicle charging system (1) includes: a connection cable (2) for supplying power from the external power source (12) such as a commercial power source; the drive battery (8); an auxiliary battery (9); and a drive battery charging device (3). The drive battery charging device (3) includes a power source circuit (7) connected to the external power source (12), the drive battery (8), and the auxiliary battery (9). Power from at least one of the external power source (12), the drive battery (8), and the auxiliary battery (9) is supplied to the control section (4). Operation of the control section (4) becomes possible with the supplied power. Accordingly, under control of the control section (4), a charge section (10) charges the drive battery (8) and the auxiliary battery (9) using power from the external power source (12).

6 Claims, 1 Drawing Sheet

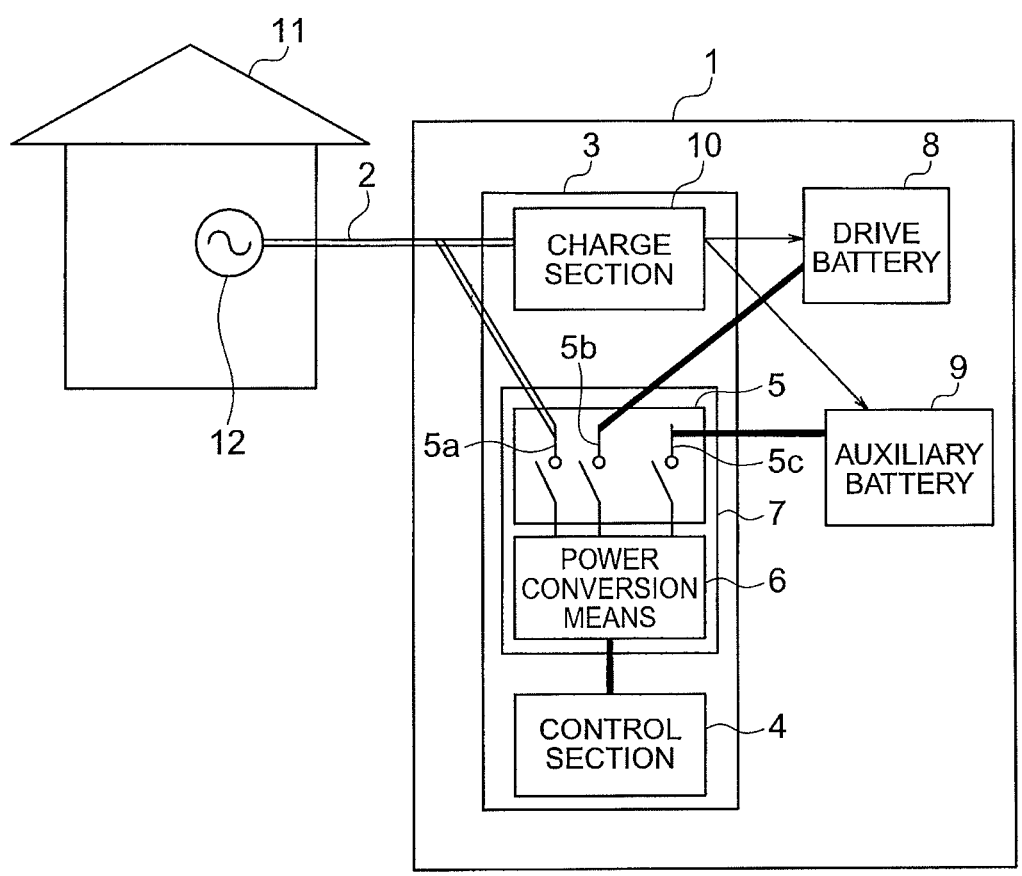

VEHICLE CHARGING SYSTEM AND VEHICLE CHARGING METHOD

BACKGROUND OF THE INVENTION

1. Field of the Invention

The present invention relates to a vehicle charging system and a vehicle charging method, and more particularly, to a vehicle charging system and a vehicle charging method for charging a drive battery of a vehicle which is capable of being charged from outside of the vehicle.

2. Description of the Related Art

In recent years, there have been developed an electric vehicle and a hybrid vehicle as environmentally-friendly vehicles. Such vehicles are provided with a drive battery and a running motor, and run on the running motor with the use of power from the drive battery. Therefore, it is necessary to charge the drive battery. The drive battery can be charged by receiving power from an external power source such as a commercial power source.

When charging is performed, a control power source circuit (control section) controls a drive battery charging device. Therefore, supply of power to the control power source circuit is necessary.

JP 2008-149897 A discloses a charging system for a vehicle, which performs supply of power to a control power source circuit with the use of power from an auxiliary battery and power from a drive battery.

In the charging system for a vehicle described in JP 2008-149897 A, when power cannot be supplied from both of the auxiliary battery and the drive battery, the supply of power to the control power source circuit is cut off. Thus, the drive battery charging device cannot operate. As a result, the drive battery cannot be charged.

SUMMARY OF THE INVENTION

The present invention has been made to solve the above-mentioned problem, and therefore has an object to provide a vehicle charging system and a vehicle charging method, which are capable of supplying power to a control section to charge a drive battery, even when it is impossible to supply power from the batteries included in a vehicle.

According to the present invention, there is provided a vehicle charging system, including: a drive battery for supplying power to a running motor of a vehicle; an auxiliary battery for supplying power to auxiliary equipment of the vehicle; and a drive battery charging device for charging the drive battery by receiving power from an external power source, in which: the drive battery charging device includes: a control section; and a power source circuit for supplying power to the control section; and the power source circuit includes: power conversion means which is connected to a plurality of power sources including the external power source, and supplies power from at least one of the plurality of power sources to the control section; and switching means for switching ON/OFF of connection between each of the plurality of power sources and the power conversion means.

In the present invention, the vehicle charging system includes: the drive battery for supplying power to the running motor of the vehicle; the auxiliary battery for supplying power to the auxiliary equipment of the vehicle; and the drive battery charging device for charging the drive battery by receiving power from the external power source, in which: the drive battery charging device includes: the control section; and the power source circuit for supplying power to the control section; and the power source circuit includes: the power conversion means which is connected to the plurality of power sources including the external power source, and supplies power from at least one of the plurality of power sources to the control section; and the switching means for switching ON/OFF of connection between each of the plurality of power sources and the power conversion means. Therefore, even when it is impossible to supply power from the battery included in the vehicle, power can be supplied to the control section to charge the drive battery.

BRIEF DESCRIPTION OF THE DRAWING

FIG. 1 is a block diagram illustrating a configuration of a vehicle charging system according to embodiment 1 of the present invention.

DETAILED DESCRIPTION OF THE PREFERRED EMBODIMENT

Embodiment 1

FIG. 1 is a block diagram illustrating an overall configuration of a vehicle charging system 1. In FIG. 1, the vehicle charging system 1 includes a connection cable 2, a drive battery charging device 3, a drive battery 8, and an auxiliary battery 9.

The vehicle charging system 1 is mounted in a vehicle such as an automobile. The vehicle runs on a running motor (not shown) with the use of power from the drive battery 8. The auxiliary battery 9 supplies power to auxiliary equipment (lamp, wiper motor, power window motor, microcomputer, and the like) provided on the vehicle.

At a house 11 or the like, an external power source 12 such as a commercial power source is provided. The vehicle charging system 1 is connected to the external power source 12 via the connection cable 2.

The drive battery charging device 3 includes a control section 4, a power source circuit 7, and a charge section 10. The power source circuit 7 includes power source switching means 5 and power conversion means 6.

The drive battery charging device 3 charges the drive battery 8 and the auxiliary battery 9 by the charge section 10 with the use of power supplied from the external power source 12 via the connection cable 2.

The power source switching means 5 includes a plurality of switches 5a, 5b, and 5c. The switch 5a has one end connected to the connection cable 2, and another end connected to the power conversion means 6. The switch 5b has one end connected to the drive battery 8, and another end connected to the power conversion means 6. The switch 5c has one end connected to the auxiliary battery 9, and another end connected to the power conversion means 6. The power source switching means 5 switches ON/OFF of each of the switches 5a, 5b, and 5c under control of the control section 4.

The power conversion means 6 obtains power from each of the external power source 12, the drive battery 8, and the auxiliary battery 9 via the switches 5a, 5b, and 5c, respectively, and supplies each power to the control section 4 after conversion of the power. The control section 4 detects an amount of power supplied from each of the external power source 12, the drive battery 8, and the auxiliary battery 9, and selects one of the external power source 12, the drive battery 8, and the auxiliary battery 9 as the most effective power source based on the detected amounts of power. The control section 4 operates with the use of the power supplied from the selected power source. The control section 4 controls the charge section 10. The charge section 10 charges the drive battery 8 and the auxiliary battery 9 under control of the control section 4.

Next, with reference to FIG. 1, detailed description is given of a charging process flow of the vehicle charging system 1, which adopts a vehicle charging method according to this embodiment. In the power source circuit 7, the switches 5a, 5b, and 5c of the power source switching means 5 are all in an ON state regardless of whether or not power is supplied. In this state, power may be supplied from all of the external power source 12, the drive battery 8, and the auxiliary battery 9. In this manner, power is supplied to the control section 4, and accordingly the control section 4 starts its operation. The control section 4 first detects the most effective power source among the external power source 12, the drive battery 8, and the auxiliary battery 9. For example, if the control section 4 detects that the supply of power from the external power source 12 is most effective, the control section 4 selects the external power source 12 to have the highest priority, and controls the power source switching means 5. Power from the drive battery 8 and power from the auxiliary battery 9 are used as auxiliary inputs. In this manner, the control section 4 operates by obtaining the power from the external power source 12 as the main power.

As described above, in this embodiment, even if power cannot be supplied from the auxiliary battery 9 and the drive battery 8, the power source circuit 7 can supply power to the control section 4 by the use of the external power source 12. Accordingly, in this embodiment, operation of the control section 4 is always possible, and therefore charging of the drive battery 8 is always possible.

Note that, this charging process flow is always effective, and it is possible to dynamically switch to the power source having the highest priority based on transition of the supplied power amount. That is, by repeatedly executing the charging process flow at a predetermined cycle, the most effective power source at that time may be always selected.

Note that, when the vehicle charging system 1 is connected to the external power source 12 via the connection cable 2, the supply of power from the external power source 12 is mostly selected to have the highest priority. The reason is as follows. The drive battery 8 and the auxiliary battery 9 are charged by power from the external power source 12 through the drive battery charging device 3. Meanwhile, power from the external power source 12 is converted in the drive battery charging device 3. Therefore, compared with the case where power from the external power source 12 is directly supplied to the control section 4, the efficiency of supply of power from the drive battery 8 or the auxiliary battery 9 to the control section 4 is reduced by the efficiency of power conversion. Therefore, the supply of power from the external power source 12 is mostly selected to have the highest priority.

However, the external power source 12 is not always selected as the power source to the control section 4. The following options (choices) may be given as power sources to the control section 4:

Option 1: combination of external power source 12, auxiliary battery 9, and drive battery 8;

Option 2: combination of drive battery 8 and external power source 12;

Option 3: combination of auxiliary battery 9 and external power source 12;

Option 4: only external power source 12;

Option 5: only drive battery 8; and

Option 6: only auxiliary battery 9.

In Options 1 to 3, there are a plurality of power sources, and hence the power source which is most effective in supply of power among the plurality of power sources may be selected as the power source having the highest priority, and the other power source(s) may be used as auxiliary input(s). The power source determined as the auxiliary input is disconnected by turning off the corresponding switches 5a, 5b, and 5c in the power source switching means 5. When the power source having the highest priority is disconnected or the voltage therefrom is lowered, the power source is switched.

Note that, in this embodiment, an example is described in which the external power source 12 is the commercial power source, but the external power source 12 may be a high-voltage DC power source capable of rapid charging. The drive battery 8 may also be a high-voltage DC power source capable of rapid charging.

Further, in this embodiment, an example is described in which, when there are a plurality of power sources, the control section 4 detects the amount of power supplied from each of the power sources, and selects the power source having the highest priority. However, when the vehicle charging system 1 is connected to the external power source 12 via the connection cable 2, without detecting the supply power amounts, the control section 4 may select the external power source 12 as the power source having the highest priority.

Further, in this embodiment, an automobile is exemplified as a vehicle, but the present invention is applicable to any other vehicles such as a vessel, as long as the vehicle includes a drive battery. Further, an electric vehicle and a hybrid vehicle are exemplified as an automobile, but the present invention is applicable to any other automobiles as long as the automobile includes a drive battery.

In the present invention, as described above, even when supply of power from the batteries in the vehicle to the control section 4 of the drive battery charging device 3 is cut off, by the supply of power from the external power source 12, the drive battery 8 may be charged. This technology may contribute to widespread use of environmentally-friendly electric vehicles and hybrid vehicles.

What is claimed is:

1. A vehicle charging system, comprising:
   a drive battery for supplying power to a running motor of a vehicle;
   an auxiliary battery for supplying power to auxiliary equipment of the vehicle; and
   a drive battery charging device for charging the drive battery by receiving power from an external power source, wherein:
   the drive battery charging device comprises:
   a control section; and
   a power source circuit for supplying power to the control section; and
   the power source circuit comprises:
   a power converter which is connected to a plurality of power sources including the external power source, and supplies power from each of the plurality of power sources to the control section; and
   a switch for switching ON/OFF of a connection between each of the plurality of power sources and the power converter,
   wherein the control section detects amounts of power supplied from each of the plurality of power sources and selects at least one of the plurality of power sources as a power source to power the control section based on the detected amounts of power.

2. The vehicle charging system according to claim 1, wherein the plurality of power sources comprise the external power source, the auxiliary battery, and the drive battery.

3. The vehicle charging system according to claim 1, wherein the plurality of power sources comprise the drive battery and the external power source.

4. The vehicle charging system according to claim 1, wherein the plurality of power sources comprise the auxiliary battery and the external power source.

5. The vehicle charging system according to claim 1, wherein the switch performs the switching under a state in which the external power source has a highest priority.

6. A vehicle charging method for charging a charging system disposed in a vehicle,
   wherein the charging system includes: a drive battery for supplying power to a running motor of the vehicle; an auxiliary battery for supplying power to auxiliary equipment of the vehicle; and a drive battery charging device for charging the drive battery by receiving power from an external power source,
   wherein the drive battery charging device includes: a control section; and a power source circuit for supplying power to the control section,
   the vehicle charging method comprising:
   connecting the power source circuit to a plurality of power sources including the external power source and supplying power from each of the plurality of power sources to the control section;
   detecting an effective power source among the plurality of power sources;
   switching a connection between each of the plurality of power sources and the control section so that the detected effective power source has a highest priority;
   supplying power from the effective power source to power the control section; and
   charging the drive battery by use of the power from the external power source under control of the control section,
   wherein the detecting the effective power source comprises detecting amounts of power supplied from each of the plurality of power sources and selecting the effective power source among the plurality of power sources based on the detected amounts of power.

* * * * *